Dec. 18, 1956    L. BURWEGER ET AL    2,774,606
TRAILER WITH ELEVATABLE BED
Filed June 17, 1954    3 Sheets-Sheet 1

INVENTORS
LORENZ BURWEGER
PAUL E. KREKER
BY
ATTORNEY

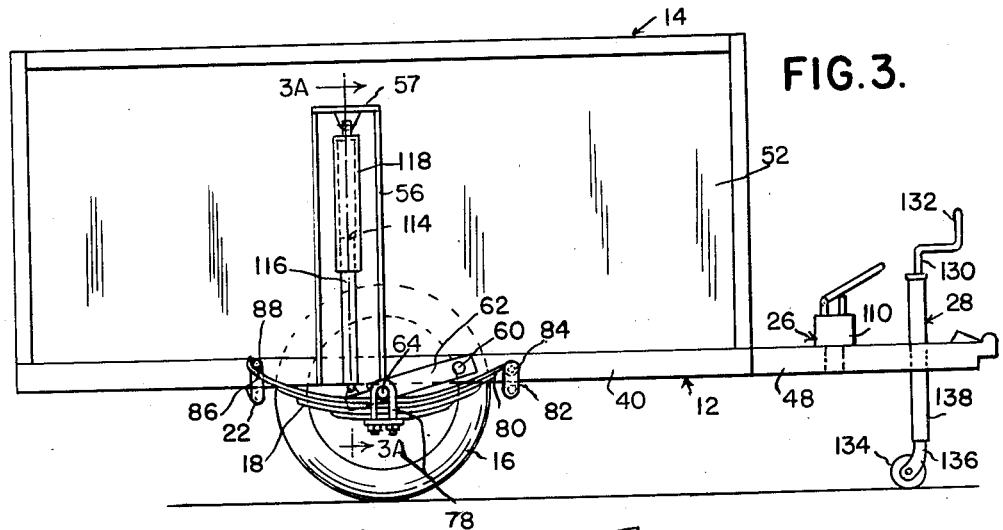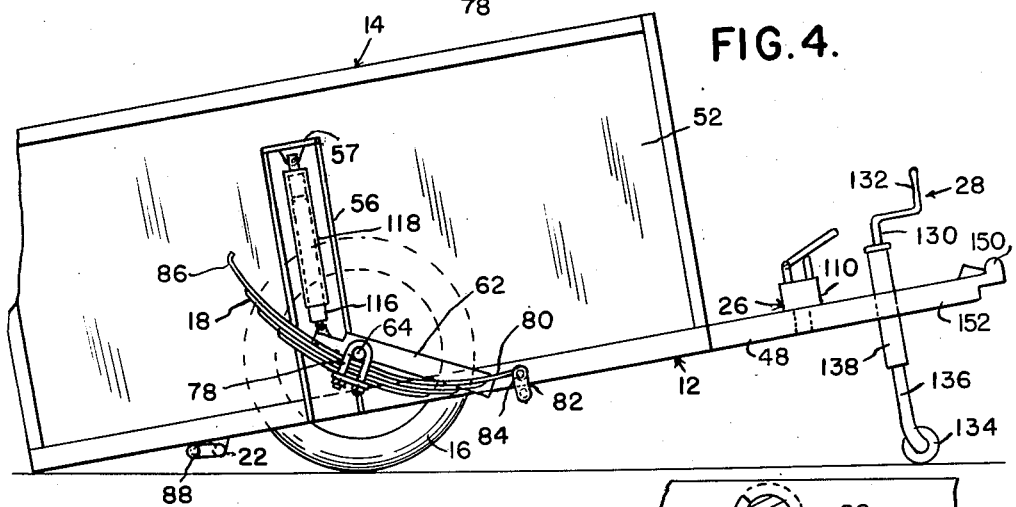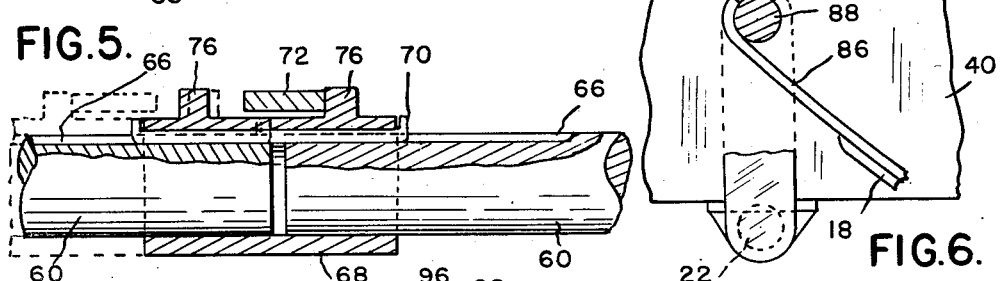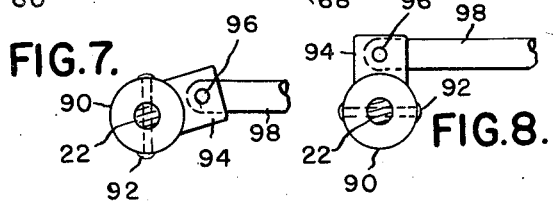

Dec. 18, 1956     L. BURWEGER ET AL     2,774,606
TRAILER WITH ELEVATABLE BED
Filed June 17, 1954     3 Sheets-Sheet 3
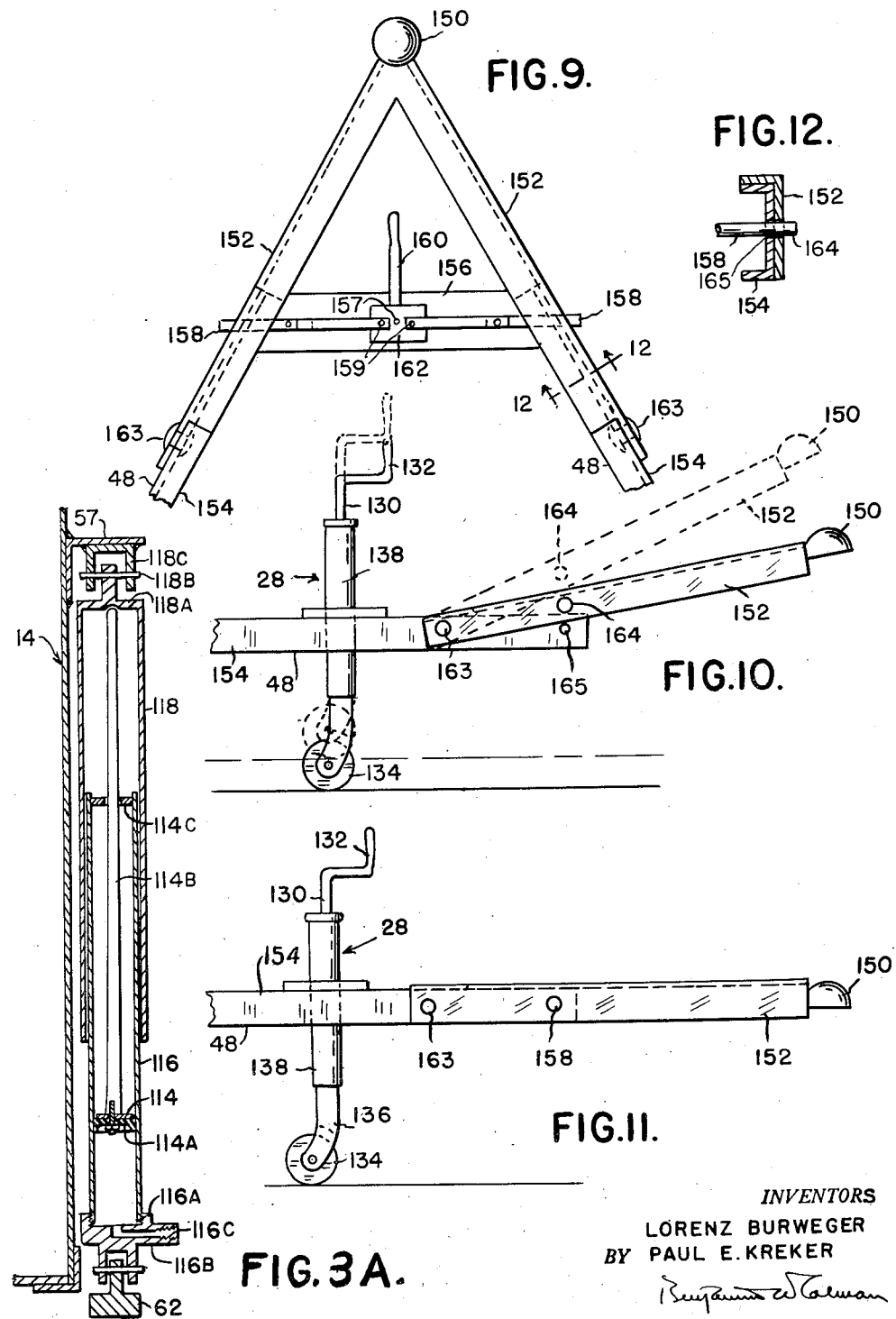
INVENTORS
LORENZ BURWEGER
BY PAUL E. KREKER
ATTORNEY

United States Patent Office 2,774,606
Patented Dec. 18, 1956

2,774,606

TRAILER WITH ELEVATABLE BED

Lorenz Burweger, Harper Woods, and Paul E. Kreker, Royal Oak, Mich.

Application June 17, 1954, Serial No. 437,341

7 Claims. (Cl. 280—44)

This invention relates to a vehicle trailer structure, and more particularly to a novel and inventive trailer structure embodying a hydraulic lift mechanism and a supporting wheel structure that is self-equalizing and provides independent springing for each wheel among other improvements, so that the trailer can be attached to the rear end of a suitable draft vehicle, lowered to ground level for loading and raised therefrom for transportation of loads.

The trailer construction of this invention embodies a trailer frame, a trailer body, independent wheel axles and spring assemblies supported by the frame, hydraulic mechanism to lift the trailer body from ground contact position to a raised load carrying position, and to lower the body again to ground contact position for easy loading and unloading, a wheel spring assembly fixedly anchored by shackles at one end thereof to the trailer frame and freely supporting a frame mounted crank arm at its other end, and a linkage arrangement connected to the wheel axles and to the crank arm shaft which simultaneously equalizes the trailer for lowering and disengages the trailer frame from the free supporting end of the wheel spring assembly. The trailer frame construction contains a further improvement in a means for lowering the trailer body and floor to a level more closely approaching ground level, while the trailer is anchored to the draft vehicle.

In lift trailers of this general category, one of the principal problems has been the provision of a suitable means to equalize the lowering of the trailer to the ground contact level. Cable equalizing mechanisms have been used with greater or lesser success, but each of these has been costly and only moderately satisfactory when put to constant use. The single transverse wheel supporting axle has also been a problem in that the spring assemblies mounted thereon have been subject to limitations in their supporting contact with frame engaging arms. Under fairly normal, but severe, road conditions, the engagement of the spring assemblies with thef rame arms has not always been satisfactory.

It has therefore been an object of this invention to provide a trailer frame that supports independently sprung wheels; to provide independent axles for each wheel; to provide a wheel spring assembly positively anchored at one end thereof to the trailer frame structure; to provide a crank arm rotatable into and out of engagement with the free end of the spring assembly; to provide a hydraulic lift mechanism that raises the trailer body out of engagement with the wheel spring asesmbly and lowers it to ground contact level and which raises the trailer body into position for engagement with the wheel spring assembly; to provide a linkage mechanism, manually operable, which connects the independent wheel axles together into a stabilized equalizing structure and which, simultaneously, takes the frame mounted crank arm out of and into engagement with the free end of the wheel spring assembly; to provide a frame structure that permits anchoring of the trailer to the draft vehicle whether the trailer is in raised or lowered position; and to embody these improved features of construction into a trailer of the type described in an economical, efficient and satisfactory manner.

Additional features and objects of the invention will become more apparent from the description given below. For a visual understanding of the invention, reference may be had to the drawings accompanying this specification and made an integral part hereof, and in which Fig. 1 is a side elevaational view of the trailer of this invention.

Fig. 3 is a side elevational view of the trailer of Fig. 1, taken substantially on the line 3—3 of Fig. 2, looking in the direction of the arrows.

Fig. 3A is a vertical sectional view taken substantially on the line 3A—3A of Fig. 3.

Fig. 4 is a side elevational view similar to Fig. 3, showing the trailer in ground contact position.

Fig. 5 is a detailed enlarged fragmentary partially sectional view of the wheel axle connecting mechanism which equalizes the trailer for lowering to ground contact level.

Fig. 6 is a detailed enlarged fragmentary partially sectional view of the frame mounted crank arm mechanism which engages the free end of the wheel spring assembly.

Fig. 7 is a fragmentary enlarged vertical sectional view taken substantially on the line 7—7 of Fig. 2 showing the shaft connection of the frame mounted crank arm with the disengaging linkage, in engagement position.

Fig. 8 is a view similar to that of Fig. 7, showing the position of the elements in disengagement relation.

Fig. 9 is a top plan view of the trailer frame portion at the draft vehicle connection end, embodying the improvement that permits closer ground level contact for the forward end of the trailer.

Fig. 10 is a side elevational view of the forward frame portion of the construction shown in Fig. 9, with and adjusted position being shown in broken lines.

Fig. 11 is a side elevational view of the construction shown in Fig. 9, showing the trailer frame in travelling position.

Fig. 12 is an enlarged vertical sectional view substantially on the line 12—12 of Fig. 9.

Figure 2:
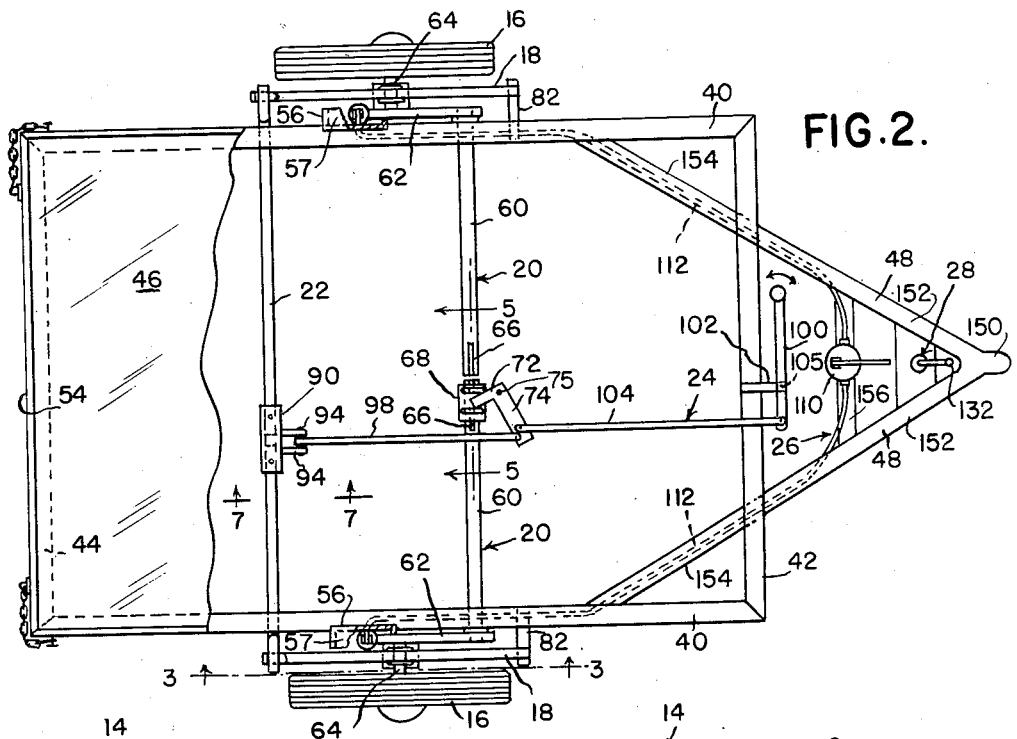
Fig. 2 is a top plan view, partially cut away to see more clearly the trailer frame and mechanism embodying the invention, in the trailer of Fig. 1.
Figure 1:
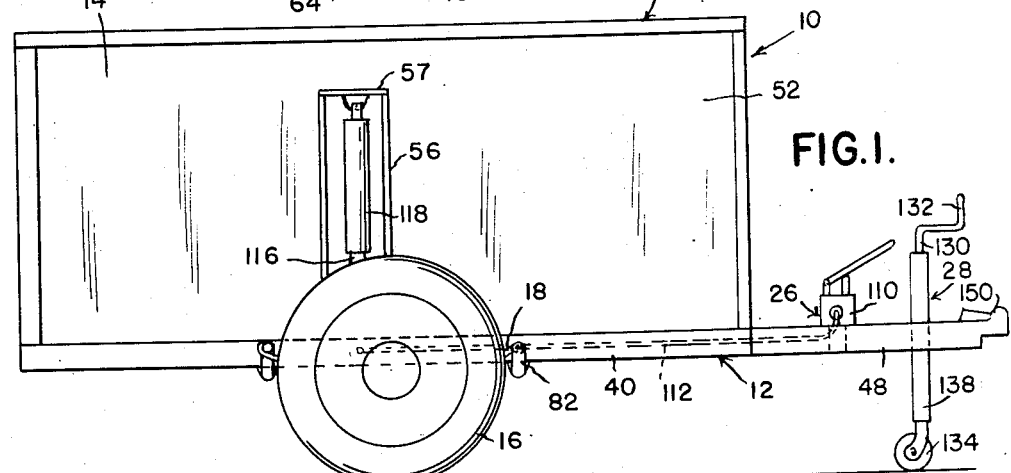

As shown in Figs. 1 and 2, the trailer 10 comprises a frame assembly 12, a body 14, wheels 16, wheel supporting spring assemblies 18, wheel axles 20, a frame mounted wheel spring engaging crank arm rod 22, linkage 24, a hydraulic trailer body lift system 26, and a forward trailer lift and lowering mechanism 28.

The frame assembly 12 comprises a body frame of angle and channel members arranged, in a preferred form in a rectangle and having side members 40, a front member 42, a rear member 44, a floor 46, and a pair of draw members 48, affixed to the side and front members, angularly disposed to each other and terminating in an apex at which point a suitable vehicle coupling is affixed. Any number of cross members may be arranged across the trailer framing, from side member to side member, as required.

Body 14, comprising front and side walls 52 and a tail gate 54 of suitable construction well known in the trailer and truck art, is mounted upon the frame asesmbly 12, or built integrally therewith. Affixed to each of the side walls 52 of the body and mounted directly on the framing side members 40 are channel lift frames 56 having a top web member 57, whose functional performance and structural relationship will be more fully described below.

The wheels 16 are generally of the type used on vehicle trailers and comprise a wheel member with a rubber tire about its periphery encasing an inflatable inner tube. The construction of the wheels, their bearing elements, etc., are so well known in the art that further description is deemed unnecessary. A pair of these wheels 16 are mounted on wheel axles 20 that comprise rotatable shafts 60 arranged in suitable frame mounted bearing supports (not shown), a crank arm 62 and a stub wheel shaft or axle 64. It will be carefully noted that the rotatable axle shafts 60 extend only half-way across the trailer framing. In the opposed ends of these shafts are key slots 66, shown in enlarged view in Fig. 5. A bearing coupling 68 rides on a key 70 slidingly disposed in the key slot 66 of both of the shafts 60, broken lines of Fig. 5. An arm 72 of bell crank 74, pivotally mounted at 75 on the trailer framing as an element of linkage 24, rides in between the bearing lugs 76 to slidingly shift the key 70 into engagement with both shafts 60 or with a single shaft. The functional advantages of this construction will be described in more detail below in connection with the operation of the structure.

Affixed to the stub shaft or axle 64 and suspended therefrom is a semi-elliptic leaf spring assemby 18 arranged and supported in the usual manner by means of U-bolt spring hangers 78. The forward end 80 of the spring assembly is mounted upon a spring shackle 82 affixed to frame member 40, which permits rotation of the spring assembly about the shackle pin 84 but does not permit release of the spring assembly therefrom. This is accomplished in the usual manner by curling the end of the top most spring leaf about the shackle pin. The rear end 86 of spring assembly 18 is arranged with a slightly upturned portion of the top most spring leaf to engage the frame crank arm rod 22, which is arranged transversely of the trailer framing (Fig. 2), is suitably bearing-supported thereon, and terminates at each end thereof in a wheel spring engaging crank arm 88, positioned outwardly of the trailer framing and is arranged to rotate in a clockwise direction to a position verticaly above the rod axis for engagement with the rear end 86 of the spring assembly, and to rotate counter-clockwise to a position substantially horizontally aligned with the rod axis and out of engagement with the rear end 86 of the spring assembly.

A sleeve coupling 90 fixed to rod 22 by pins 92 is arranged with lugs 94 supporting a pin 96 that holds a link member 98 thereto, Figs. 7 and 8. As shown in Fig. 2, one end of the link member 98 is connected to coupling 90 and the forward end is connected to the bell crank 74, the member 98 being an element in the linkage 24. A manual release lever 100 is pivotally mounted on a support 102 at the forward and operating end of linkage 24 and is connected to a link member 104 that leads to and is conjoined to the bell crank 74. Thus, when the lever 100 is rotated about its fulcrum 105 on support 102, the link members 104 and 98 move rearwardly, sliding the bearing coupling 68 and key 70 across both axle shafts 60 locking them together for simultaneous rotation. Thus, neither wheel crank arm 62 will rotate without the other. The functional purpose and advantages of this construction wil appear further below.

The hydraulic lift mechanism 26 comprises a hydraulic pump assembly 110 mounted on the trailer frame 12 at its forward end ahead of body 14, suitable hydraulic tubing and lines 112 leading and connected to hydraulic pistons 114 arranged in telescoping sleeves 116 and 118 on the body frame lift elements 56. The sleeve 116 is pin mounted on the rear end of wheel shaft crank arm 62 and the sleeve 118 is pin mounted to the top web plate 57 of channel lift frame 56. Sleeve 118 is closed at the top, and sleeve 116 is open at its top end to permit passage upward and downward of piston 114 within the sleeves. This sleeve construction protects the hydraulic piston from road grime, moisture and other harmful effects without disturbing its function.

As shown in Fig. 3A, sleeve 118 is a hollow cylinder closed at its top by a cap portion 118A arranged with an opening for mounting the sleeve 118 to web plate 57 by a pin 118B through yoke 118C. Sleeve 116 is also a hollow cylinder capped at its lower end by cap 116A arranged with a passage 116B to carry the hydraulic fluid back and forth through port 116C, in the hydraulic system. A piston 114 is disposed in sleeve 116, operable by the hydraulic fluid to move upwardly. A neoprene rubber or leather cup 114A seals the piston in sleeve 116. A piston rod 114B passes upward through sleeve 118 to seat in a recess in the underside of cap portion 118A. A piston rod guide 114C is threadedly mounted at the upper end of sleeve 116 to guide the reciprocating movement of the piston rod 114B. Thus, when hydraulic fluid is forced into sleeve 116, piston 114 moves upwardly causing the piston rod 114B to push sleeve 118 and trailer body 14, to which sleeve 118 is attached by means of web plate 57, upwardly. Upon exhaustion of hydraulic fluid from sleeve 116, the weight of trailer body 14, bearing on piston 114, causes the trailer body to lower into hanger rod supporting position or to ground level contact.

The forward end of the trailer framing 12 also supports a lift and lowering mechanism 28 i nthe form of a screw 130 terminating at its top in a crank arm 132, that lifts or lowers the forward end of the trailer. A wheel 134 is rotatably mounted on a tubular element 136 which telescopes within an outer sleeve 138, to provide a maneuerable forward end for the trailer. This construction permits manual adjustment to the variable height of trailer couplings on vehicles and for movement across the terrain to the vehicle when the vehicle cannot be brought to the trailer. When the trailer is disengaged from the vehicle, it may be lowered close to ground level by revolving crank arm 132 on screw 130, causing the element 136 to telescope upward into the sleeve 138.

An improved forward end trailer framing is shown in Figs. 9, 10, 11 and 12. Here, the vehicle coupling 150 is arranged at the apex of a triangular draft form comprising angle members 152, channel frame members 154, a cross member 156, locking pins 158, and a pin actuating lever 160 pivotally mounted on cross member 156 at 157 and connected by a plate 162 to the pins 158 at 159.

Trailer framing channel members 154 are pivotally connected to the angle members 152 by pins 163, and are provided with locking pin holes 165 forwardly of the pins 163. Angle members 152 are provided with locking pin holes 164 forwardly of pins 163, which holes 164 are aligned with holes 165 of members 154. Lifting mechanism 28 is designed to be embodied in the trailer framing across the channel members 154.

The construction of the forward end of the trailer framing has been designed to permit vehicle anchoring of the trailer at all times, i. e. when the trailer 10 is being lowered to ground level position and when it is being raised to load transporting position. Upon reference to Figs. 9 through 12 inclusive, it will be noted that the vehicle coupling 150 is designed to be anchored directly to the vehicle fitting (not shown). Coupling 150 is of a standard type well known and long used in the art, and it or an equivalent coupling may be used at the apex of angle members 152. In running position, shown in Fig. 11, locking pins 158 are passed through channel frame member holes 165 and angle member holes 164, to prevent relative movement between the members 152 and 154 which are pivotally connected by pins 163 rearward of the holes. When the trailer body 14 is to be lowered, a preferred practice is to shift lever 160 on its pivot 150, causing pins 158 to withdraw from holes 164 and 165 in members 152 and 154, respectively. This places the trailer body in readiness to be lowered at its forward end by means of mechanism 28.

Figures 13, 14:
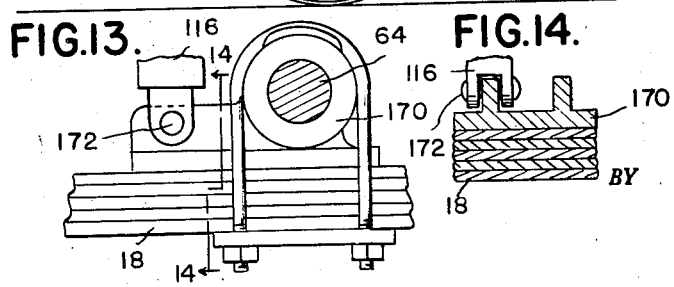
Fig. 13 is a fragmentary vertical elevational view of an alternative spring and trailer body connection in the lift mechanism.
Fig. 14 is a fragmentary sectional view substantially on the line 14—14 of Fig. 13.

An alternative connection arrangement for the piston sleeve 116 is to anchor the same to a bracket 170 by pin 172 as shown in Figs. 13 and 14, instead of to the outboard end of shaft crank arm 62. The functional result however is substantialy the same. Because of certain structural interference that may be encountered in connecting the bottom of sleeve 116 to the crank arm 62, the alternative connection structure of Figs. 13 and 14 may be preferred.

In operation, the trailer 10 is designed to be hooked and latched to a vehicle coupling or fitting (not shown) of conventional design by means of trailer coupling 150. The trailer body 14 is shown in Figs. 1 and 3 in raised load transporting position. Ordinarily, the forward lift mechanism 28 has the wheel 134 raised above the ground line when the trailer is being drawn. The linkage lever 100 is in the position shown in Fig. 2, wherein the separate wheel axle shafts 60 are disconnected and independent of each other, permitting free and independent springing of wheels 16.

Spring assemblies 18 are in trailer supporting position, the forward end 80 being shackle connected to the frame side member 40 and the rear end 86 being disposed under the frame hanger rod crank arm 88, so that the trailer body 14 rests entirely upon the axle mounted spring assembly 18. In this position, wheel axle crank arm 62 rotates about the longitudinal axis of shafts 60.

The hydraulic trailer body lift system 26, which is preferably an oil system, should be exhausted for the transporting operation. The hydraulic pump 110 is of conventional construction and such as may be purchased in many industrial supply houses throughout the country. The piston 114 is in lowered position and the telescoping sleeves 116 and 118 are extended.

To lower the rear end of trailer 10, the hydraulic lift pump 110 is actuated filling the hydraulic lift system 26 with oil and raising the pistons 114 on each side of the trailer body until they meet the tops of sleeves 118 in the lift frame area 56. The pump action is continued, forcing the pistons 114 to lift the sleeves 118, pin connected to the lift frame webs 57 until the trailer body and frame supported hanger rod crank arm 88 has come up out of contact with spring rear end 86, and is sufficiently above it to clear the same when rotated on the axis of rod 22. It will be noted that as the pistons 114 rise, they cause the telescoping sleeves 116 and 118 to extend themselves and increase the distance between the top of sleeve 118 and the end of crank arm 62 to which sleeve 116 is pin mounted. As piston 114 rises in sleeve 118, it forces that sleeve to move upwardly with relation to sleeve 116, which guides the piston rod 114B in sliding relation thereto. Sleeve 118, sliding upwardly over sleeve 116, against the upward movement of piston rod 114B, forces the trailer body 14 to rise with respect to the end of crank arm 62 where sleeve 116 is pin mounted.

Lever handle 100 is then rotated about its pivot, causing bell crank 74 to shift the coupling sleeve 68 and key 70 in axle shaft key slots 66 until the coupling and key have conjoined the two axle shafts 60. This structure prevents lowering of one side over the other and possible damage to the trailer if an unbalanced load should shift or distort the trailer body and/or framing. At the same time link 98 has rotated rod 22 causing the crank arm 88 to move away and out of possible contact with the rear spring end 86.

After this has been done, the hydraulic system is exhausted, and trailer body and frame settle down upon the pistons 114, on each side of the body, in a uniform, balanced and stabilized manner. The ground contact position shown in Fig. 4 is then achieved. To lower the forward end of the trailer, locking pins 158 are moved out of frame openings 162 and 164 by means of lever 160. Screw 130 is rotated by means of crank arm 132 until the wheel 134 has reached the lower end of sleeve 138. This is shown in broken lines in Fig. 10. The forward angle framing members 152 are then arranged at a substantial angle to the ground line, the coupling 150 being held fastened to the vehicle fitting. If the lift mechanism sleeve 138 should be mounted substantially higher than shown in the drawings, the entire bottom of the trailer 10 could be brought to rest upon the ground line. Such modification of lift mechanism anchoring structure is well within the skill of artisans familiar with the art to which the invention pertains.

In ground contact position, the trailer body may be loaded or unloaded by direct contact without lifting the load. The tail gate 54 is unhooked or released and is dropped to the ground line, providing an apron leading to and from the trailer floor 46. Two, three or four wheeled trucks or material handling equipment can be rolled directly onto the trailer floor from the ground line.

To raise the trailer body and frame into travelling position, the tail gate 54 is first raised and hooked or otherwise fastened in place. The screw 130 is rotated until the forward draw frame members 152 and 154 are aligned so that locking pins 158 will pass through openings 162 and 164, making the draw frame rigid and straight. The hydraulic pump is then actuated filling the system with oil and the pistons 114 are raised thereby, extending the sleeves 116 and 118 and pushing the trailer body 14 upward against wheel crank arm 62, or, in the case the alternative construction is used, against bracket 170 mounted on spring assembly 18, until the rear end 86 of the spring assembly 18 is substantially below the level of the hanger rod crank arm 88.

At this point, lever 100 is moved back toward its original position, as shown in Fig. 2, which causes sleeve coupling 90 to rotate in a clockwise direction and to rotate the crank arm 88 in a similar direction about the rod axis, bringing the crank arm 88 directly above the rear end 86 of the spring. At the same time, the bearing coupling 68 with key 70 is moved out of engagement with both axle shafts 60, and now rides only on one of them. This provides for free and independent wheel springing of each wheel.

Hanger rod crank arm 88 is lowered into supporting contact with spring end 86 by exhausting the oil from the hydraulic system, causing the weight of the trailer body and framing to bear down upon the pistons 114 and to bring the trailer frame supported hanger rod 22 down with them, so that crank arm 88 engages spring end 86. Forward wheel 134 is then raised by screw 130, and trailer 10 is ready to move forward.

From the above description, it will be clearly apparent that the construction here disclosed is simple, economical and efficient, and capable of rendering satisfactory service under severe road and load conditions for long periods of time.

Having described our invention in its simplest terms, the details of construction may be changed and varied in greater or lesser degree without departing from the essence of the invention or from the scope of the appended claims.

We claim:

1. A trailer of the type described comprising a framed trailer body, draft framing conjoined to said body at its forward end adapted to be removably connected to a draft vehicle, trailer body hanger means rotatably supported on said body framing, independent wheel axle shafts supported on said body framing forward of said hanger means and substantially parallel thereto, said wheel axle shafts having crank arms and wheel supporting stub shafts on said crank arms outwardly of said body framing, semi-elliptic wheel spring assemblies fixedly and rotatably anchored at their forward ends on each side of said body framing and free at their rearward ends to rotate about their forward ends, said spring assemblies being mounted on said stub shafts, said hanger means having eccentric crank arms outboard of said trailer body engageable upon and disengageable from said free rear ends of said spring assemblies upon rotation of said latter crank arms, linkage means movably supported on said body and draft framing simultaneously coupling said wheel axle shafts together and rotating said hanger means out of an engaging position with said spring assemblies, and simultaneously disassociating said wheel axle shafts and rotating said hanger means into a position for engagement with said spring assemblies, and hydraulic lift means mounted on said body and draft framing adapted to raise said trailer body and said hanger means out of engagement with said spring assembly free rearward ends and to lower said trailer body to ground level when said spring assemblies and said hanger means have been disassociated by relative movement of said linkage means, and adapted to raise said trailer body and said hanger means from ground level into a position for engagement with said spring assembly free rearward ends upon relative movement of said linkage means and to lower said trailer body and hanger means into supported position upon said spring assembly free rearward ends.

2. The trailer structure defined in claim 1, and in which the anchored forward ends of said wheel spring assemblies include shackles connecting their forward ends to said framing.

3. The trailer structure defined in claim 1, and in which said linkage means comprises a rotatable coupling fixed to said hanger means, a sliding coupling normally positioned on one of said wheel axle shafts, and lever means connecting said rotatable coupling and said sliding coupling, and adapted to actuate the movement of said couplings simultaneously.

4. A trailer of the type described comprising a frame assembly, a trailer body mounted on and conjoined to said frame assembly, said frame assembly being articulately connectable at its forward end to a draft vehicle, assembly-supported rotatable independent transverse wheel axles having crank arms and stub wheel shafts arranged outwardly of said frame assembly at either side thereof, semi-elliptic spring means mounted on said stub shafts adjacent said frame assembly, wheels mounted rotatably on said stub shafts outwardly of said spring means, said spring means being fixedly and rotatably anchored at their forward ends to said frame assembly and being free to rotate at their rearward ends, a frame-assembly mounted transverse rotatable hanger rod parallel to and spaced rearwardly of said wheel axles, said hanger rod having spring means engaging crank arms outwardly of said frame assembly at either side thereof, hydraulic lift means mounted on said frame assembly and said body including sleeve enclosed hydraulic lift pistons conjoined to said wheel axle crank arms rearwardly of said stub shafts and to said body to lift said body and frame mounted hanger rod crank arms out of a position of engagement with and support on said spring free rearward ends, movable linkage means mounted on said frame assembly simultaneously coupling said wheel axles together and rotating said hanger rod crank arms out of an engaging position with said spring means, whereby said hydraulic lift means is adapted to lower said frame assembly to ground level and to raise said frame assembly therefrom to a traveling position when said linkage means is actuated to simultaneously disassociate said wheel axles and rotate said hanger rod crank arms into a position for engagement with said spring means and said frame assembly is lowered by said hydraulic means into said latter position.

5. The trailer structure defined in claim 4, in which said linkage means comprises a conjunctive series of frame supported levers, a frame mounted bell crank intermediately connected to said levers, a sliding wheel axle coupling operatively engaged by said bell crank and mounted on and in constant engagement with one of said axles and adapted to be shifted by said bell crank into coupling association with the other of said axles, whereby said axles are coupled for rotative movement.

6. The trailer structure defined in claim 5, in which said linkage means includes a hanger rod affixed sleeve connected to one end of one of said frame supported levers, the other end of said one lever being connected to said bell crank, said hanger rod being rotatable by said one lever when said pivoted bell crank is actuated.

7. A trailer of the type described comprising a trailer body, framing conjoined to and supporting said body connectable to a draft vehicle, aligned independent wheel axles mounted rotatably on said framing having crank arms and wheel stub shafts at either side of said framing, semi-elliptic spring means fixedly mounted on said stub shafts and having their forward ends fixedly and rotatably anchored to said framing, the rearward ends of said spring means being free to rotate about their forward ends, wheels rotatably mounted on said stub shafts outwardly of said spring means, a hanger rod mounted rotatably on said framing transversely thereof and parallel to and to the rear of said wheel axles, said rod having crank arms at either side of said framing adapted to rest upon the rearward ends of said spring means in trailer body supporting position and to swing out of supporting position to a point beyond the arc of rotation of said spring rearward ends, linkage means mounted on said framing including a sliding coupling normally positioned on one of said wheel axles adapted to associate both said wheel axles, a lever actuated bell crank having an arm thereof adapted to slide said coupling into position associating said axles and to slide said coupling out of said associating position, a lever actuated rotatable sleeve fixedly mounted on said hanger rod adapted to rotate said hanger rod crank arms into and out of spring engaging position, said bell crank and said sleeve being lever connected so that said coupling and said sleeve slide and rotate respectively simultaneously, whereby when said coupling by sliding associates said wheel axles said hanger rod crank arms by rotation are moved out of spring engaging position and when said coupling by sliding disassociates said wheel axles said hanger rod crank arms by rotation are moved into spring engaging position, and hydraulic lift and lowering mechanism mounted on said trailer body and framing having piston means connected at one end to said trailer body and at the other end to said wheel stub shaft so that said trailer body and framing may be raised from a position of support upon said spring means and upon disengagement of said hanger rod crank arms by rotation from said spring means lowered to ground level, and thereafter raised again to the supported position.

References Cited in the file of this patent

UNITED STATES PATENTS

| | | |
|---|---|---|
| 2,495,449 | Francis | Jan. 24, 1950 |
| 2,540,100 | Cocur | Feb. 6, 1951 |
| 2,587,624 | Johnson | Mar. 4, 1952 |
| 2,648,546 | Falkenhagen | Aug. 11, 1953 |